United States Patent [19]

Singh et al.

[11] 3,851,268
[45] Nov. 26, 1974

[54] MINI-LASER
[75] Inventors: Shobha Singh, Summit; Legrand Gerard Van Uitert, Morris Township, Morris County, both of N.J.
[73] Assignee: Bell Telephone Laboratories, Incorporated, Murray Hill, N.J.
[22] Filed: Aug. 13, 1973
[21] Appl. No.: 388,027

Related U.S. Application Data
[63] Continuation-in-part of Ser. No. 359,231, May 11, 1973, abandoned.

[52] U.S. Cl............ 330/4.3, 331/94.5, 252/301.4 H
[51] Int. Cl.............................. H01s 3/06, H01s 3/14
[58] Field of Search ................... 331/94.5 F, 94.5 H; 350/96 WG; 330/4.3; 252/301.4 H

[56] References Cited
UNITED STATES PATENTS
3,659,915  5/1972  Maurer et al. ................ 350/96 WG
3,747,017  7/1973  Varsanyi......................... 331/94.5 F
3,761,837  9/1973  Leheny et al. ................ 331/94.5 H OTHER PUBLICATIONS
Varsanyi, "Surface Lasers," 9/15/71, Pg. 169–171, A.P.L., Vol. 19, No. 6; G-257.

*Primary Examiner*—Richard A. Farley
*Assistant Examiner*—N. Moskowitz
*Attorney, Agent, or Firm*—G. S. Indig

[57] ABSTRACT

A mini-laser package suitable for use as an optical communications oscillator includes a solid state laser and a light pump source emitting in the 7,000 to 9,000 A. region. The laser contains trivalent neodymium as the active ion in a halide host, diluants generally include lanthanum, gadolinium or cerium, trichloride or tribromide.

13 Claims, 3 Drawing Figures

MINI-LASER

CROSS REFERENCE TO RELATED APPLICATION

This application is a continuation-in-part of my co-pending application, Ser. No. 359,231 filed May 11, 1973 and now abandoned.

BACKGROUND OF THE INVENTION

1. Field of the Invention

The invention is concerned with optically pumped solid state lasers and, more particularly, mini-lasers (small sized lasers) which are pumped by light emitting diodes, tungsten filament lamps or similar sources.

2. Description of the Prior Art

The rich promise of the laser as a communications element is nearing fruition. Circuit elements including modulators, frequency shifters, isolators, transmission lines, etc., have now been developed sufficiently to show feasibility. The 1.06 $\mu$m region has been found particularly favorable for optical fiber transmission and therefore lasers emitting in this region are of particular importance.

The precise form or forms that optical communications systems may take is not yet settled. For example, it has not yet been determined whether oscillators may take the form of large scale elements serving a plurality of lines, simultaneously, or of individual elements associated with one or a small number of lines. The latter approach was given some significant impetus by the announcement of an efficient heterojunction diode laser. See application, Ser. No. 33,705 filed on May 1, 1970 (I. Hayashi Case 4). This immediately gave rise to contemplated systems utilizing miniaturized electrically biased diodes. Advantages of such a system are apparent, and this approach continues to be a distinct possibility. An impediment, which some believe to be inherent, arises from limited lifetime of such structures. Experimentally, reported lifetimes have not exceeded periods of the order of hundreds of hours of operation.

An approach alternative to the diode oscillator involves a miniaturized version of the popular $Nd^{3+}$-YAG which is end pumped by a light emitting diode (LED). Efficient direct bandgap LEDs of forward-biased GaAs operating at wavelengths of about 0.93 $\mu$m may have quantum efficiencies of about forty percent or greater. Such diodes may be alloyed using aluminum to replace part of the gallium or phosphorous to replace part of the arsenic to decrease wavelength approaching and encroaching on the visible spectrum.

The "mini-package"—the combination of the LED pump and $Nd^{3+}$ laser—has been studied extensively (see application Ser. No. 265,978 filed June 26, 1972 [R. B. Chesler 4]) and may eventually emerge as a standard oscillator package. The laser is, however, possessed of certain characteristics which may thwart ultimate fruition, The $Nd^{3+}$-YAG system so successful as an oscillator or amplifier, pulsed or cw, in its usual dimensions, does not have a sufficiently high laser transition cross section and for some applications (face pumped film structures in particular) the absorption cross section for usual LED emission wavelengths is inadequate thus far to permit the desired miniaturization in dimensions.

SUMMARY OF THE INVENTION

In accordance with the invention, the usual YAG containing $Nd^{3+}$ as the active ion in the laser contained in a miniature package is replaced. The active materials in accordance with the invention are halides of neodymium that may be modified with lanthanum, gadolinium or cerium—generally trichlorides or tribromides—athough triiodides may be utilized. The chlorides and bromides are best for self-supporting structures and may be used in supported structures as well. Iodides not readily produced in bulk form of sufficient optical perfection nevertheless lend themselves to deposition.

Examples of substrates are combinations of (La, Ce, Gd, Y)$Z_3$, where Z is CE, Br or I, that are adjusted in lattice parameter to match $NdZ_3$ (or modified films such as (Nd La)$Br_3$ that have been altered to preserve hexagonal structure comparable to that of the substrate) and contain sufficient yttrium to produce a lower index of refraction. Hexagonal flourides with matching $a_o$ values, such as Ba(Ti, Sn)$F_6$, may also be used for this purpose with $NdCl_3$.

The hosts of the invention have significantly lowered threshold powers relative to YAG lasers, particularly for emission wavelengths from available LEDs, tungsten filament lamps and other economical sources. Depending upon total etalon losses, thresholds may be reduced by a factor of two or better relative to YAG.

DETAILED DESCRIPTION

1. Laser Composition

Figure 1:
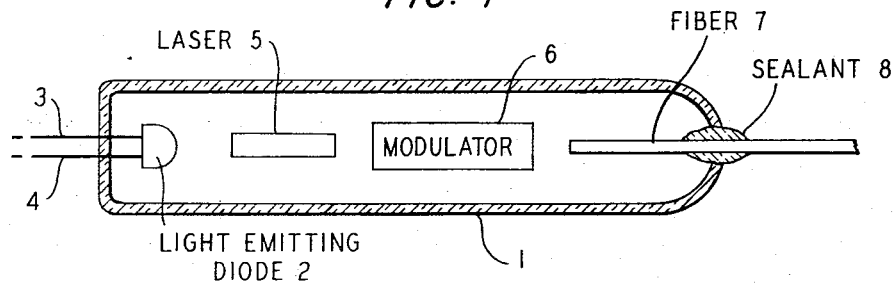
FIG. 1 is a front elevational view of a minipackage containing LED laser and modulator.

Halide hosts that may be employed in accordance with the invention are the trichlorides, tribromides, and triiodides of lanthanum, gadolinium or cerium. This selection is based on considerable experimentation and takes into account laser characteristics, as well as ease of preparation. It is essential that all compositions be essentially anhydrous, and each of the compound hosts may easily be prepared in anhydrous form. The iodides, it has been indicated, tend to be soft and flaky and are, therefore, less desirable for self-supporting or bulk laser structures—that is, structures having least dimensions of the order of a fraction of a millimeter. The triiodides are, however, considered promising for thin film lasers—that is, lasers that are supported films approximately 20$\mu$m in thickness. Such films may eventually be coupled to individual fiber lines perhaps in integrated circuits. Supported thin film structures may also be prepared from the trichlorides and tribromides. These materials may be successfully used with very high Nd-concentrations as they do not suffer from internal excitation relaxation processes that quench emission in oxides and flourides at high Nd-concentrations.

As discussed under "Preparatory Techniques," the rare earth cations are known to be hygroscopic and preparation normally includes a procedure for removing water of hydration. It is also desirable to protect the laser from moisture-containing ambient during operation. The sealed configuration shown in FIG. 1 accomplishes this end.

Presence of water of hydration is significant largely from the standpoint of absorption peaks generally accompanying such inclusion. OH absorption harmonics center about infrared wavelengths of 0.9 and 1.4 $\mu$m and are still significant in tail regions at the primary laser emission wavelength which is about 1.06 $\mu$m.

Neodymium content is, for these purposes, specified as the ion quantity $x$ in the general formula $M_{1-x}Nd_x(Cl, Br, I)_3$ where M is La, Ce, or Gd and may be modified by inclusion of up to about 1 percent $Sm^{2+}$ with concomitant anion variation. In these terms, the overall range for neodymium is from about 0.005 to 1.0. For end pumped arrangements such as that depicted in FIG. 1, the desired range is from about 0.01 to 0.1 The higher doping levels are useful primarily for thin film applications where relatively large absorption cross sections are required because of short pump traversal length.

As in all laser compositions, impurities, particularly impurities having significant absorption cross sections either in pump or emission frequencies, should be avoided. Standards of purity common in transistor fabrication—i.e., approximately 99.99 percent by weight—are suitable.

2. Material Characteristics

The structure of the tribromides and trichlorides of lanthanum or cerium $GdCl_3$ and $NdCl_3$ has been analyzed as hexagonal $P6_3/m$-$C_{6h}$ with two formula units per unit cell. Lattice parameters $a_o$ and $c_o$ have been measured at 7.468 Angstrom units and 4.366 Angstrom units, respectively, for the compound $LaCl_3$. Site symmetry for the cation has been determined to be $C_{3h}$ with nine neighboring anions. In comparison, the structure of $NdBr_3$ and the iodides is orthorhombic $v_h^{17}$ (Ccmm), with four formula units per unit cell. $NdBr_3$, however, can be diluted with La to obtain a hexagonal material that will match a $CeBr_3$ type substrate.

The above measurements are considered sound within the accuracy of the instrumentation utilized. Lattice parameters are, however, included only as general information. The inventive advance does not depend on these measurements but rather depends on laser characteristics noted.

The presence of $Ce^{3+}$ or $Sm^{2+}$ in the halide crystal may be helpful in improving laser performance where large outputs are required. It is possible for $Nd^{3+}$ ions in the $^4I_{11/2}$ state to be relaxed by interactions with $Ce^{3+}$ or $Sm^{2+}$ ions in their ground states without draining the $Nd^{3+}$ *efficient* $F_{3/2}$ lasing level, since the $^2F$ manifold of $Ce^{3+}$ and the $^7F$ manifold of $Sm^{2+}$ only span ~ 2200 and 3000 $Cm^{-1}$, respectively.

3. The Drawing

FIG. 1 depicts a hermetically sealed envelope 1 containing a light emitting diode (LED) 2 provided with leads 3 and 4 connected to power source not shown. Exemplary LEDs are forward-biased gallium arsenide diodes, for example, doped with 10 to 50 atom percent aluminum 5 to 30 atom percent phosphorus based on total cation so as to result in efficient emission over the 7,000 to 9,000 Angstrom units wavelength band (e.g., $Al_{0.35}Ga_{0.65}As$ or $P_{0.13}Ga_{0.87}As$ emits at 8,100 Angstrom units at about room temperature). Laser 5 is a neodymium-containing trihalide of a composition here specified. Modulator 6 may, for example, be an electrooptic or magnetooptic modulator operating in digital or analog fashion and composed for example, of lithium-tantalate or yttrium-iron garnet, respectively. The arrangement depicted includes a transmission line 7 which may be a silica or modified silica core glass line, for example, of the type described in U.S. Pat. No. 3,659,915 issued May 2, 1972. Envelope 1 is hermetically sealed to fiber 7 by sealant 8. A suitable polyepoxide or polyurethene or, alternatively, a low melting inorganic glass such as a borosilicate, or $As_2S_3$ base glass may serve as sealant. Envelope 1, generally amorphous, may be constructed of any water-impermeable material such as silica or a borosilicate glass.

Figure 2:
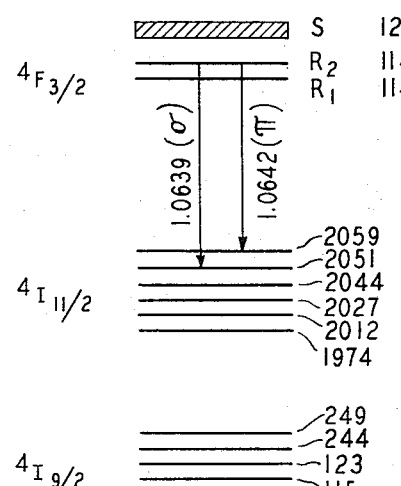
FIG. 2 is an energy diagram for an illustrative system herein.
Figure 3:
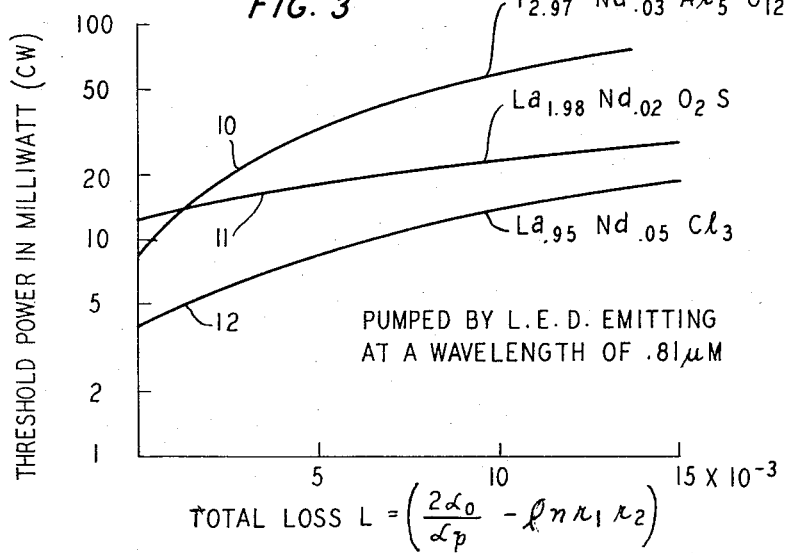
FIG. 3 on coordinates of threshold power and total etalon loss relates these two parameters for a YAG–$Nd^{3+}$ laser and a typical laser in accordance with the invention.

FIGS. 2 and 3 are discussed in conjunction with the following section.

4. Laser Characteristics

The primary emission lines for $Nd^{3+}$ characteristically lie near 1.06 $\mu$m. Host materials of the invention are generally anisotropic. $LaCl_3$, for example, is uniaxial and when activated by $Nd^{3+}$ has relatively low gain and high energy storage in the crystallographic $c$ direction. Gain is higher along the $a$ axis, and threshold is lower. Due to the anisotropic nature of the host, emission in the $a$ direction is plane polarized.

Absorption within the band defined by the approximate limits of from about 7,000 to about 9,000 Angstrom units are significantly greater for optimum compositions of the invention as compared with that for optimum YAG–$Nd^{3+}$ compositions. Absorption for $La_{.95}Nd_{.05}Cl_3$ is from eight to 10 times as large as that for $Y_{2.97}Nd_{.03}Al_5O_{12}$.

Emission transition cross sections for optimum compositions are also greater than those for corresponding optimum YAG compositions. For example, the transition cross section for 1.0639 $\mu$m (primary $a$ axis line) is approximately 5.5 times that for YAG. For 1.0642 $\mu$m emission, (primary $c$ axis line) the cross section is approximately 3.5 times that for YAG. Lifetimes for the excited lasing state are comparable to those of YAG and also those of lanthanum oxysulfide. A characteristic composition herein may have an excited lifetime of about 200 microseconds or less. By comparison, that for YAG may be about 230 microseconds and that for the oxysulfide, about 100 microseconds.

A partial energy level diagram is presented in FIG. 2. While the precise levels are those for $Nd^{3+}$ in the $LaCl_3$ host it is generally characteristic of other hosts in accordance with the invention. It is seen that the diagram is of the general form of the four-level system characteristic of neodymium in other hosts. Pump bands most suitable for LED pumping are the A, S and R multiplets.

Of greater direct significance to the design engineer is the data presented in the form of FIG. 3. Coordinates are threshold power—milliwatts (this is the actual power output of an LED operating at a wavelength of 8,100 Angstrom units). The experimental arrangement was that shown in FIG. 1 with an end face area available for end pumping of $1.642 \times 10^{-3} cm^2$. Abscissa units show total loss in terms of:

$$L = 2\alpha_o/\alpha_p - n\ r_1 r_2 \qquad (1)$$

where $\alpha_o$ equals loss such as scattering, excited state absorption, etc. $\alpha_p$ equals effective pump absorption cross section, $n$ is the usual designation for natural logarithm; $r_1$ equals power reflectivity of mirror on one end; $r_2$ equals power reflectivity of mirror on the other end. The abscissa units are, therefore, indicative of the total loss of the etalon including laser contents. Three curves are presented. Curve 10 is for an optimum YAG-neodymium system; curve 11 is for an optimum lanthanum oxysulfide-neodymium system; and curve 12, plotted for an optimum lanthanum-trichloride neodymium system, is characteristic of compositions of the invention. All three laser crystals were of high optical quality and, therefore, made little loss contribution to $L$. Data points indicated largely reflect a variation in transmission of an end mirror of the etalon so that zero total loss corresponds with total mirror reflection (zero output). It is seen that the threshold value is approximately twice as low for a composition of the invention as compared with the conventional YAG host equivalent, with the ratio increasing for real conditions in which loss is non-zero. The oxysulfide composition reported in 42, Journal of Applied Physics, 3043 (1971) and considered by many to represent a considerable improvement over YAG is included for comparison purposes. It is seen that threshold for the oxysulfide, which overtakes that for YAG for relatively low transmission, is invariably higher than that of the trichloride plotted.

5. Design Dimensions

It should be emphasized that lasers of the invention are designed for specialty use. Poorer heat dissipation, hygroscopic properties, and temperature coefficient of expansion are all inferior to YAG–Nd$^{3+}$. Lasers of the invention are significant by virtue of their lowered threshold, thereby suggesting their use in the mini-laser package which constitutes a preferred embodiment of the invention. By virtue of these considerations, it is not considered likely that lasers of the invention will replace YAG–Nd$^{3+}$ or other high power lasers. The following dimensional parameters are based on one expected miniature design. In general, traversal length for stimulated emission is in a dimension which is a maximum of 15 mm. Shortest dimensions are dictated largely on the ground of expediency except where one such dimension corresponds with a pump direction. In such latter instance, where supported designs are ordinarily contemplated, such shortest dimension is ordinarily a minimum of about 5 micrometers and should not exceed about 1 millimeter. Short dimensions for self-supported structures are not basically limited particularly for end pump designs but from the standpoint of miniaturization are likely to be within the range of from about 0.2 millimeter to about 0.5 millimeter. In film structures the dimensions of the active media may be quite variable.

6. Material Preparation

Preparation of any of the compositions herein may be carried out by a number of preparatory techniques known to all those familiar with crystal growth. A procedure found suitable for preparation of a Nd activated lanthanum trichloride is set forth;

Starting materials are $La_2O_3$ and $Nd_2O_3$, both of a purity of at least 99.99 percent by weight. The oxides are dissolved in HCl solution and the solvent is then evaporated leaving behind the equivalent mixed composition $(La,Nd)Cl_3 \cdot 7H_2O$. This hydrous composition is then heated in vacuum at about 150°C. for a period of about 12 hours, yielding the anhydrous material. This is then melted at a temperature of about 1,000°C. in a sublimation flask and the vapor-state material is permitted to sublime in a portion of the flask maintained at a temperature of about 850°C. A chlorine carrier gas is utilized to expedite transfer to the cooler portion of the flask. A single crystal suitable for laser use is grown using a Stockbarger technique with growth proceeding within a sealed ampule lowered at the rate of about 1 inch per day through a gradient of about 875° to 825°C. with such gradient extending over a distance of about 1 inch.

Alternative procedures for crystal growth are suitable. Growth may be by Czochralski, zone melting, etc., the prime requirement being that water be excluded from any ambient during growth.

Subsequent treatment, such as cutting, grinding, polishing, etc., must also be carried out in a non-hydrous ambient.

When $Sm^{2+}$ is to be incorporated to facilatate relaxation from $Nd-^4I_{11/2}$, use of chlorine transfer medium should be eliminated to keep the Sm in the divalent state. The practical limits of Sm are from zero to one atom percent of the cations present.

What is claimed is:

1. Laser apparatus including an optically pumped solid state laser containing trivalent neodymium as the active ion, together with a light source emitting in the 7,000 to 9,000 Angstrom region in such direction as to be made incident on the said laser, the said radiation constituting the pump energy necessary for operation of the said laser, characterized in that the laser consists essentially of a single crystal consisting essentially of a composition which may be represented by the atom formula $M_{1-x}Nd_xZ_3$, where M consists essentially of at least one rare earth element selected from the group consisting of lanthanum, gadolinium and cerium and Z is at least one halogen selected from the group consisting of chlorine, bromine, iodine, and in which $x$ is a value within the range of from 0.005 to 1.0.

2. Laser apparatus including an optically pumped solid state laser containing trivalent neodymium as the active ion, together with a light emitting semiconductor diode with means for forward-biasing said diode so as to emit electromagnetic radiation in such direction as to be made incident on the said laser, the said radiation constituting the pump energy necessary for operation of the said laser, characterized in that the laser consists essentially of a single crystal consisting essentially of a composition which may be represented by the atom formula $M_{1-x}Nd_xZ_3$, where M consists essentially of at least one rare earth element selected from the group consisting of lanthanum, gadolinium and cerium and Z is at least one halogen selected from the group consisting of chlorine, bromine, iodine, and in which $x$ is a value within the range of from 0.005 to 1.0.

3. Laser apparatus including an optically pumped solid state laser containing trivalent neodymium as the active ion, together with a light emitting semconductor diode with means for forward-biasing said diode so as to emit electromagnetic radiation in such direction as to be made incident on the said laser, the said radiation constituting the pump energy necessary for operation of the said laser, characterized in that the laser consists essentially of a single crystal consisting essentially of a composition which may be represented by the atom formula $M_{1-x}Nd_xZ_3$, where M consists essentially of at least one rare earth element selected from the group consisting of lanthanum, gadolinium, and cerium and Z is at least one halogen selected from the group consisting of chlorine, bromine, iodine, and in which $x$ is a value within the range from 0.01 to 0.10.

4. Apparatus of claim 3 in which the said laser has a shortest dimension of from 5 micrometers to 1 millimeter and with a longest dimension of a maximum of 15 millimeter.

5. Apparatus of claim 4 in which the said laser is essentially rod shaped and in which the light emitting diode is of such design that a significant portion of its radiation is made incident on an end of the said laser.

6. Apparatus of claim 5 in which Z is chorine.

7. Apparatus of claim 6 in which M is cerium.

8. Apparatus of claim 1 in which up to one atom percent of the cations present in the said composition are divalent samarium.

9. Apparatus of claim 1 in which the said laser is supported on a substrate and has a least dimension of a maximum of 500 micrometers.

10. Apparatus of claim 9 in which $x$ is from 0.10 to 1.0.

11. Apparatus of claim 1 in which the said apparatus is hermetically sealed within a container.

12. Apparatus of claim 11 in which the contents of the said container include a modulator for altering at least one characteristic of emission from the said laser.

13. Apparatus of claim 11 in which the contents of the said container includes the end of a transmission line which latter completes the hermetic seal.

* * * * *

UNITED STATES PATENT OFFICE
CERTIFICATE OF CORRECTION

PATENT NO. : 3,851,268
DATED : November 26, 1974
INVENTOR(S) : Shobha Singh and Legrand G. Van Uitert It is certified that error appears in the above-identified patent and that said Letters Patent are hereby corrected as shown below:

Column 3, between lines 54 and 55, "$Nd^{3+}$ efficient $F_{3/2}$" should read --$Nd^{+3}$ $^4F_{3/2}$--. Column 6, claim 3, between lines 58 and 59, "semconductor" should read --semiconductor--. Column 7, claim 6, line 14, "chorine" should read --chlorine--.

Signed and Sealed this ninth Day of September 1975

[SEAL]

Attest:

RUTH C. MASON
Attesting Officer

C. MARSHALL DANN
Commissioner of Patents and Trademarks